(No Model.) 2 Sheets—Sheet 1.
F. L. McGAHAN.
OIL BURNER.
No. 476,294. Patented June 7, 1892.
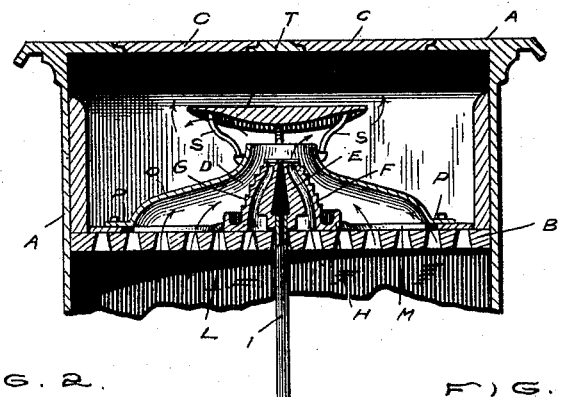
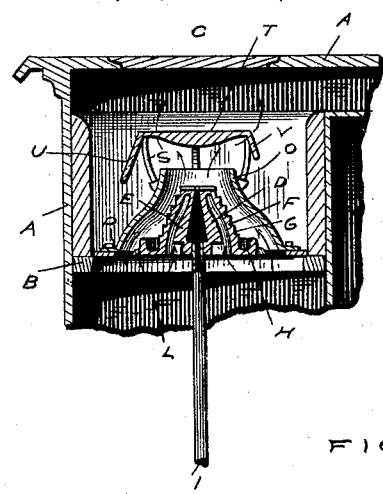
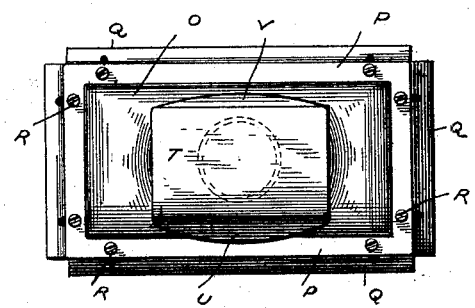
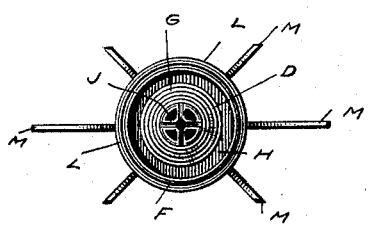
Witnesses
J. A. Seaton
N. H. O'Neal
Inventor
Fred. L. McGahan (No Model.) 2 Sheets—Sheet 2.

F. L. McGAHAN.
OIL BURNER.

No. 476,294. Patented June 7, 1892.

Witnesses
Charles P. Davis
A. L. McGahan

Inventor
Fred. L. McGahan

UNITED STATES PATENT OFFICE.

FRED L. McGAHAN, OF INDIANAPOLIS, INDIANA.

OIL-BURNER.

SPECIFICATION forming part of Letters Patent No. 476,294, dated June 7, 1892.

Application filed December 4, 1891. Serial No. 414,048. (No model.)

*To all whom it may concern:*

Be it known that I, FRED L. McGAHAN, a citizen of the United States, residing at Indianapolis, in the county of Marion and State of Indiana, have invented certain new and useful Improvements in Oil-Burners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in oil-burners, and is specially adapted for use in cooking-stoves, and it will be fully described in the following specification and more particularly pointed out in the claims, reference being had to the accompanying drawings, in which—

Figure 5:
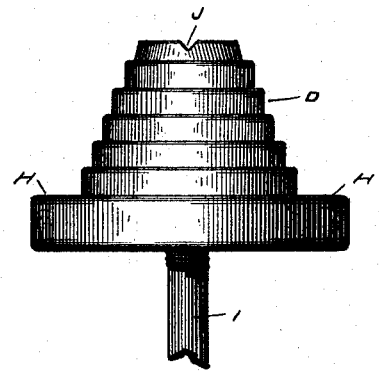
Figure 6:
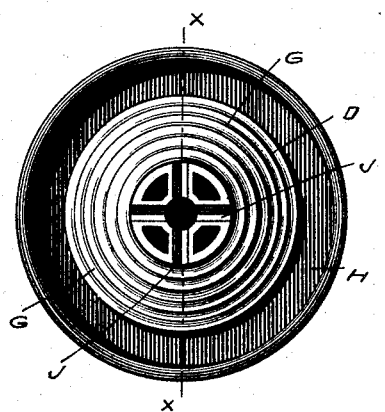
Figure 7:
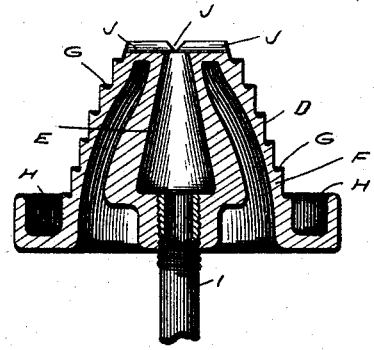

Figure 1 is a central longitudinal section through the fire-box and grate of a stove with my device in place. Fig. 2 is a central cross-section through the same. Fig. 3 is a detached top view of the burner, shell, and deflector. Fig. 4 is a top view of the burner and the spider which holds it in position within the shell. Fig. 5 is an enlarged elevation of the burner. Fig. 6 is a plan view of the same, and Fig. 7 is a central sectional view on the line $x\ x$ of Fig. 6.

In detail, A is a stove, C the lids of the same, and B the grate.

D is the burner, composed of the oil-receptacle E, which is of a cone shape, and the outer part F, which is also cone-shaped and has grooves or channels G one above the other on its outside, and at the bottom has a pan or extension H. The oil-receptacle E is connected at the bottom with a pipe I, leading to an oil-supply, and has an overflow-opening at the top into grooves J, which are formed in bridges connecting the receptacle E with the burner F, leaving an air-space between the two parts.

A spider formed of a ring L fits around the burner D and has arms M, which fit within the shell O and hold the burner in a central position. The shell O is made to fit and fill the grate, but has adjustable wings Q, connected to its flanged base P by screws R, so that it may be made slightly larger or smaller, the corners being stopped with fire-clay. The shell flares inward toward the top and has a central opening slightly larger than the top of the burner and has lugs on its outside, near the top, on which rest the feet S, found on the deflector T, which, as shown in Figs. 2 and 3, has two wings U and V, the former cutting off the flame from the front of the stove and the latter deflecting it toward the ends of the deflector, so that it will strike the top of the stove directly beneath the lids C.

It has been found in burners of this class that after they have burned for several hours the burner, becoming overheated, generates the oil-gas too fast, and, sucking the oil from the receptacle E, a great deal is wasted; but I have overcome this difficulty by having the air-space between the central receptacle E and the burner part F, so that after the burner has been heated to any degree it remains the same, the air coming up between the two parts keeping the heat of the burner stationary or equal. The best possible results are obtained from the burner, as the shell O covering the entire grate a large amount of air is furnished for draft, and by the construction of the shell the air will be partly heated before it reaches the flame, which burns out through the top of the shell and against the deflector and by it is turned so as to strike directly beneath the stove-lids. It will thus be seen that none of the heat is wasted and by the construction of the parts the heat is all utilized and the best results obtained.

Having fully described my invention, what I claim as new, and desire to secure by Letters Patent, is—

1. An oil-burner composed of two cone-shaped parts with an air-space between, connected together at the top by grooved bridges, the central cone being hollow and adapted to be connected with an oil-supply, the outer cone having grooves around its sides and a pan at its base, substantially as described.

2. An oil-burner composed of two hollow cones, one within the other, and an air-space between the two, connected at the top by grooved bridges, the outer cone having channels around its sides, in combination with a spider consisting of a ring provided with radial arms adapted to hold said burner in place within the grate, substantially as described.

3. An oil-burner composed of two hollow cones with an air-space formed between, connected at the top by grooved bridges, the inner cone adapted to be connected with an oil-supply, the outer cone having grooves around its sides and a projecting pan below, in combination with an inclosing shell and a deflector resting on its top above the burner, all adapted to be supported within the fire-box of the stove, substantially as described.

4. In an oil-burner, a shell forming a hood, with a circular opening therein, such shell provided with adjustable base-wings and adapted to fit in and fill the fire-box of the stove around a burner, whereby the air from below will pass through such opening of the shell and around the burner, in combination with such burner held centrally within the shell by a ring-spider, substantially as set forth.

In testimony whereof I affix my signature in presence of two witnesses.

FRED L. McGAHAN.

Witnesses:
J. A. SEATON,
H. W. NEAL.